US006573457B2

(12) United States Patent
Murakami et al.

(10) Patent No.: US 6,573,457 B2
(45) Date of Patent: Jun. 3, 2003

(54) WIRING BASE, WIRE-WOUND MEMBER PRODUCTION METHOD, WIRE-WOUND MEMBER, AND ELECTRICAL CONNECTION BOX

(75) Inventors: Masakazu Murakami, Tokyo (JP); Mitsuo Tanaka, Tokyo (JP); Tatsuo Satori, Tokyo (JP)

(73) Assignee: The Furukawa Electric Co., Ltd., Tokyo (JP)

( * ) Notice: Subject to any disclaimer, the term of this patent is extended or adjusted under 35 U.S.C. 154(b) by 0 days.

(21) Appl. No.: 09/927,198

(22) Filed: Aug. 8, 2001

(65) Prior Publication Data

US 2002/0088643 A1 Jul. 11, 2002

(30) Foreign Application Priority Data

Aug. 28, 2000 (JP) ....................................... 2000-257714
Jul. 4, 2001 (JP) ....................................... 2001-203840

(51) Int. Cl.[7] .................................................. H02G 1/00

(52) U.S. Cl. ............................ 174/135; 174/50; 174/97

(58) Field of Search ............................ 174/135, 50, 97, 174/138 Z; 439/456

(56) References Cited

U.S. PATENT DOCUMENTS 6,315,598 B1 * 11/2001 Elliot et al. ................. 439/456

* cited by examiner

*Primary Examiner*—Dean A. Reichard
*Assistant Examiner*—Jinhee J. Lee
(74) *Attorney, Agent, or Firm*—Knobbe, Martens, Olson & Bear, LLP

(57) ABSTRACT

A wiring base made from an electrical insulating material and having a plurality of wing sections radially protruding against the central axis thereof functioning as a rotation axis in a wiring work with electric wire grooves each for accommodating therein an electric wire provided in the substantially concentric form, a wire-wound member production method, wire-wound member, and an electrical connection box using the wire-wound member therein.

8 Claims, 9 Drawing Sheets

FIG. 7
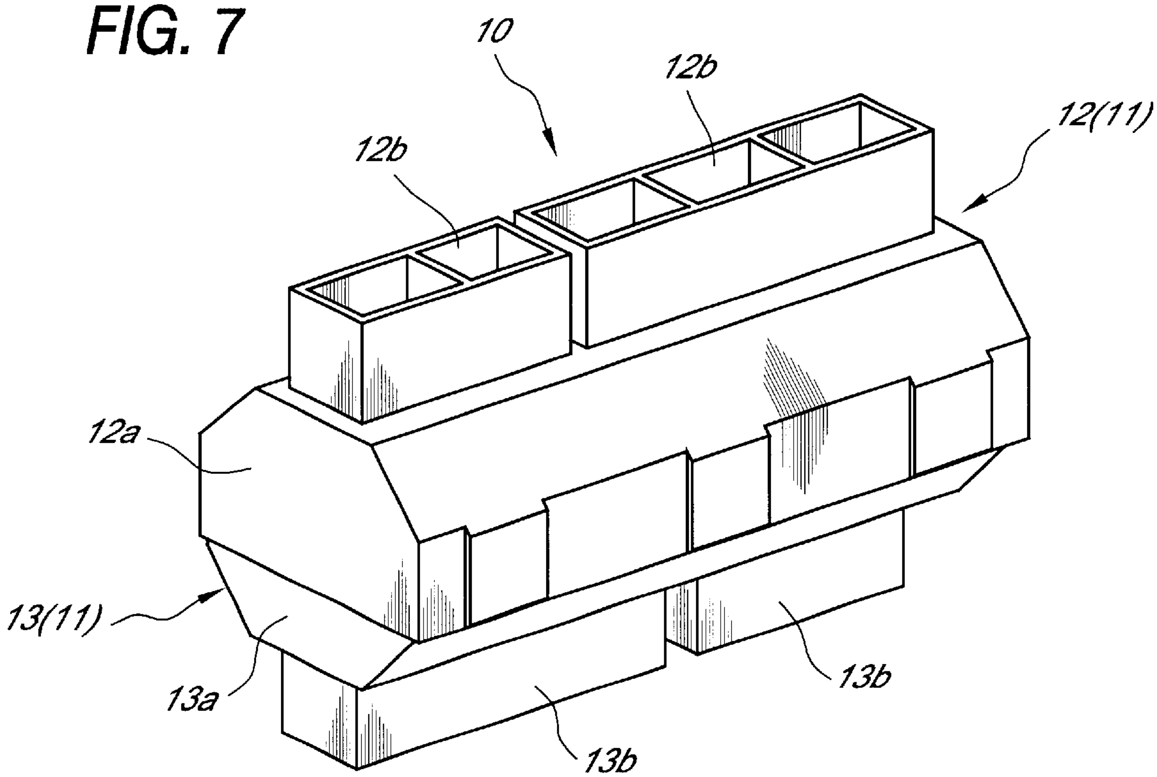
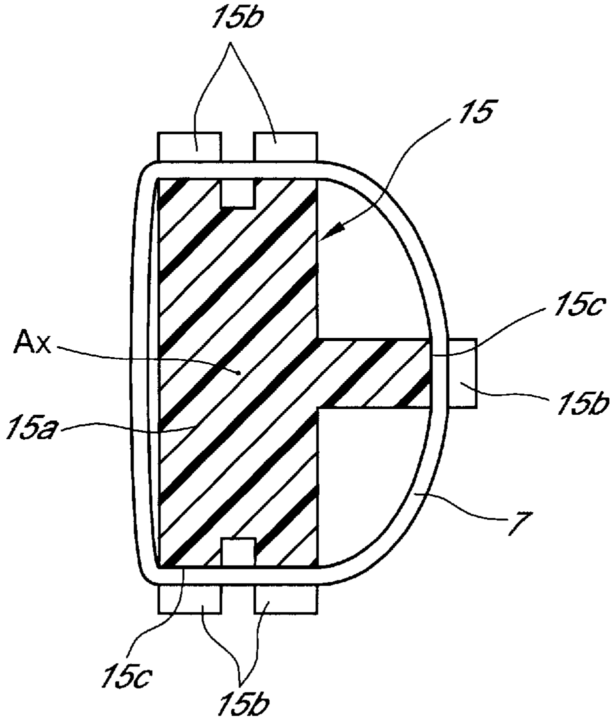
FIG. 8

WIRING BASE, WIRE-WOUND MEMBER PRODUCTION METHOD, WIRE-WOUND MEMBER, AND ELECTRICAL CONNECTION BOX

FIELD OF THE INVENTION

The present invention relates to a wiring base, wire-wound member production method, a wire-wound member, and an electrical connection box.

BACKGROUND OF THE INVENTION

Conventionally, a wire-wound member in which an electric wire is wound around a wiring base such as, for instance, a wire-wound member for an electrical connection box is produced by supporting and rotating an electrical insulating wiring base with a rotation tool, feeding an electric wire from a wiring head and winding the electric wire around the wiring base to wire the electric wire like in drawing with a single stroke, and then cutting the electric wire at a pre-specified position according to the circuit design (Refer to, for instance, Japanese Patent Application No. 18658/2000). In this step, sometimes a plurality of wiring bases are placed adjoining each other on the rotation tool, electric wires are wound around the wiring bases respectively, the plurality of wiring bases having been removed from the rotation tool are overlaid on each other by folding at the positions of electric wires connecting the adjoining wiring bases to form a wire-wound member.

When a wire-wound member is produced by rotating a wiring base with a rotation tool to wind an electric wire around the wiring base, it is necessary to move the wiring head to and away from the wiring base in a complicated way to evade interference between the rotating wiring base and the wiring head.

Namely, as shown in FIG. 13A and FIG. 13B, a wiring base B rotates so that the external periphery follows the locus Lc indicated by the dash-and-dot line in the figures, and an electric wire W fed out from a wiring head H is wired. In this step, it is required to make the wiring head H move in association with rotation of the wiring base B in a complication way like moving away from the axis Ax by the range R which is substantially equal to the radius of the locus Lc as indicated by the arrow A1 in FIG. 13A or moving to the axis Ax by ½ R which is substantially equal to ½ of the radium of the locus Lc.

SUMMARY OF THE INVENTION

It is an object of the present invention to provide a wiring base, wire-wound member production method making it possible to produce a wire-wound member only by moving a wiring head in a direction along the rotation axis with low cost and without causing interference between the wiring base and the wiring head, a wire-wound member, and an electrical connection box in which this wire-wound member is used.

To achieve the object described above, the wiring base according to the present invention comprises an electrical insulating material and has a plurality of wing sections each radially protruding against the axis functioning as a rotation axis in the wiring work, and electric wire grooves for accommodating electric wires therein respectively are formed in the substantially concentric form on the plurality of wing sections.

Also to achieve the object described above, in the wire-wound member production method according to the present invention, a wire-wound member is produced by rotating a wiring base having a plurality of wing sections each made from an electrical insulating material, extending in the axial direction and at the same time radially protruding from the axis with electric wire grooves each for accommodating electric wire therein formed in the substantially concentric form or the electric wire around the axis of the wiring base and also relatively moving the electric wire or the wiring base in the axial direction of the wiring base to wind the electric wire in the electric grooves.

Further to achieve the object described above, the wire-wound member according to the present invention is produced by the production method described above.

In addition, to achieve the object described above, in an electrical connection box according to the present invention, the wire-wound member produced by the production method described above is accommodated in the casing.

The present invention can provide a wiring base, wire-wound member production method making it possible to quickly produce a wire-wound member only by moving a wiring head in one direction along the rotation axis with low cost and without causing any interference to the wiring base and also can provide the wire-wound member and an electrical connection box using the wire-wound member therein.

The above-described and other objects, features and advantages of the present invention will be more fully understood by referring to the detailed description as well as to the attached drawings.

BRIEF DESCRIPTION OF THE DRAWINGS

FIG. 7 is a perspective view showing the manufactured electrical connection box;

FIG. 8 is a cross-sectional view showing a first variant of the wiring base according to the present invention;

DETAILED DESCRIPTION OF THE INVENTION

Detailed description is made below for the wiring base, the wire-wound member production method, the wire-wound member, and an electrical connection box using the same therein each according to one embodiment of the present invention with reference to FIG. 1 through FIG. 12.

Figure 1:
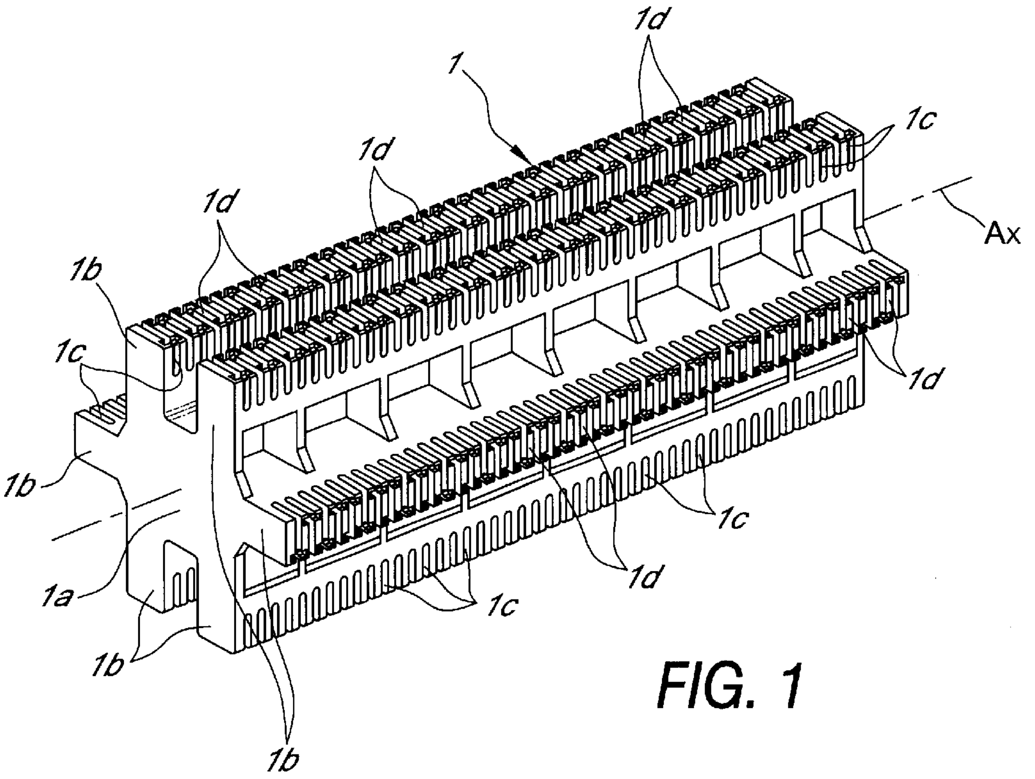
FIG. 1 is a perspective view showing a wiring base according to the present invention.
Figure 2:
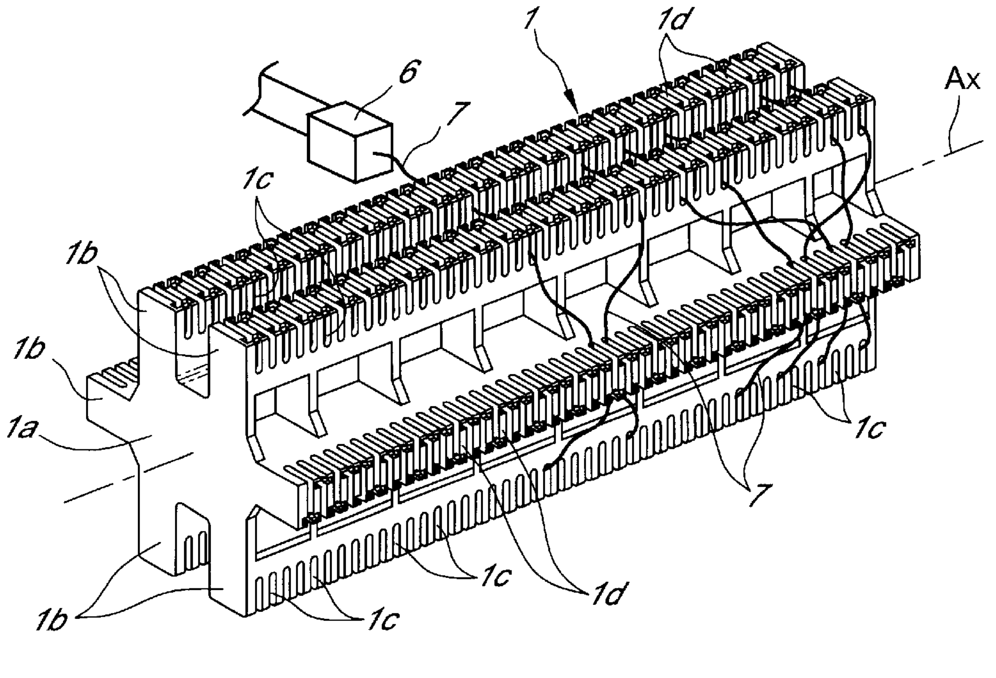
FIG. 2 is a perspective view showing the situation in which an electric wire is wired in electric wire grooves of the wiring base shown in FIG. 1.

At first, the wiring base according to the present invention is described with reference to FIG. 1.

Figure 4:
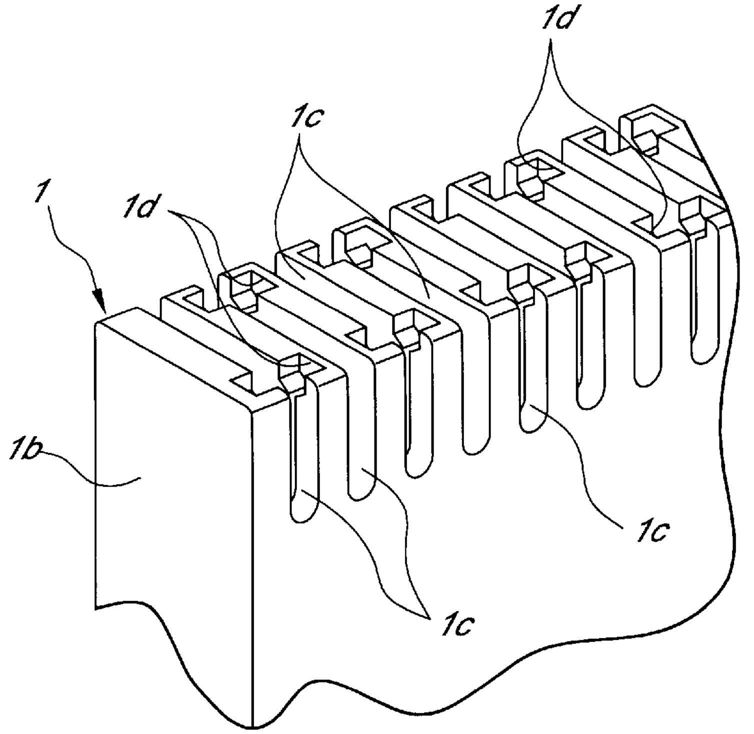
FIG. 4 is an enlarged perspective view showing a terminal groove of the wiring base shown in FIG. 1.

A wiring base 1 is made from a synthetic resin such as polypropylene (PP), polybutylene terephthalate (PBT), or nylon, and has a main body 1*a* and a plurality of wing sections 1*b* as shown in the figure. The main body 1*a* has an axis Ax functioning as a rotation axis in the work for wiring, and a plurality of wing section 1*b* protrude from the main body 1*a* radially against the axis Ax. The plurality of wing sections 1*b* has an equal length measured in the radial direction from the axis Ax. The plurality of wing sections 1*b* have the configuration in which the electric wire grooves 1*c* each for accommodating an electric wire therein (Refer to FIG. 4) are at tips of these wing sections in the substantially concentric form. Also the plurality of wing sections 1*b* have the terminal grooves 1*d* formed at the tips respectively as shown in FIG. 4.

Figure 3:
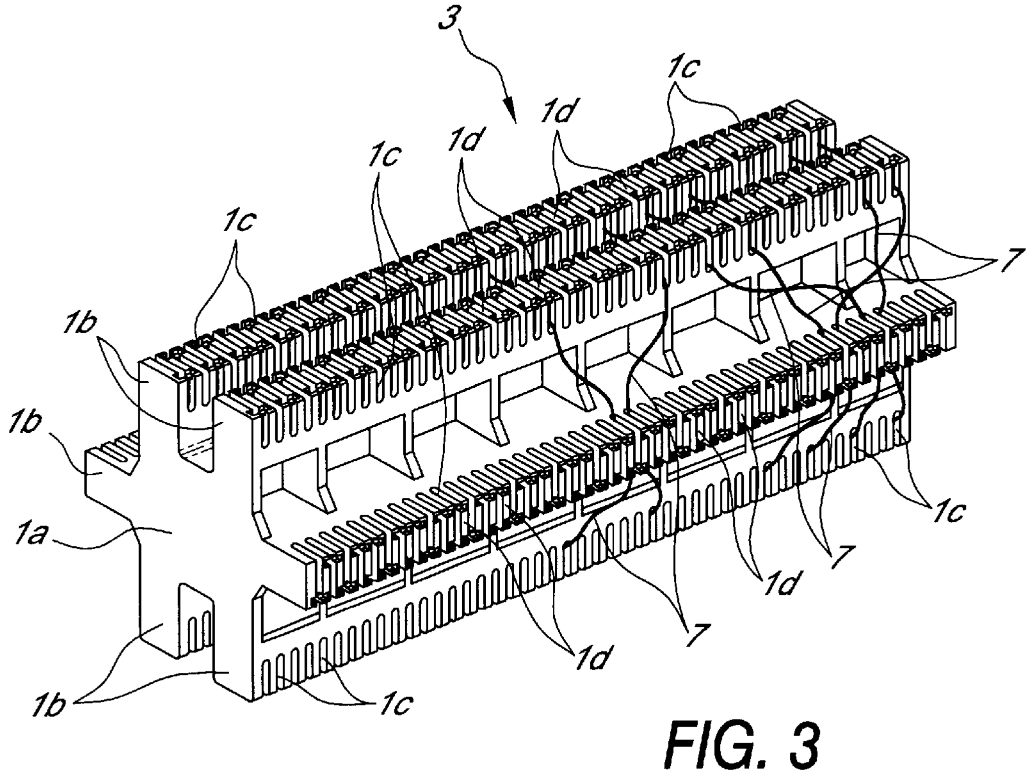
FIG. 3 is a perspective view showing a wire-wound member produced by wiring an electric wire in the electric wire grooves.

The wiring base 1 having the configuration as described above is attached to a rotation tool not shown in the figure, and an electric wire 7 supplied from a wiring head 6 is wound around the main body 1*a* by rotating the main body 1*a* about the axis Ax to wire the electric wire 7 in the required wiring grooves 1*c* according to a preset wiring pattern. The wire-wound member 3 shown in FIG. 3 is produced by wiring the electric wire 7 as described above.

Figure 5A:
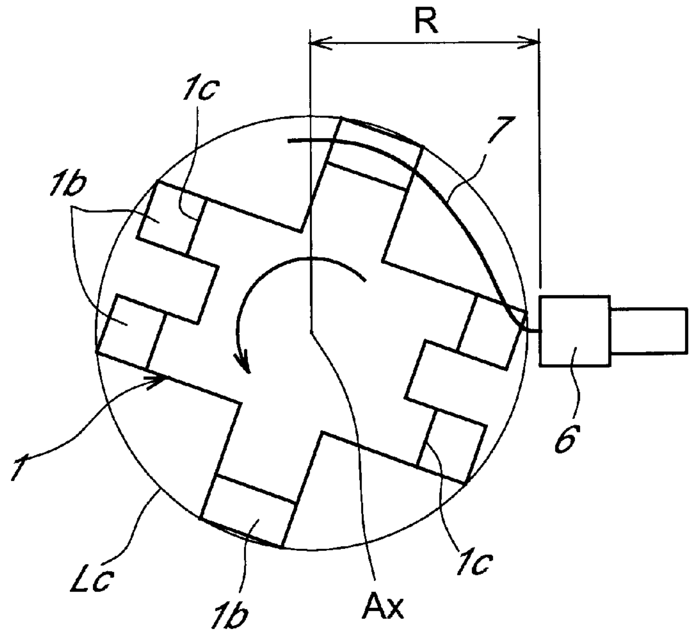
FIG. 5A and FIG. 5B are explanatory views showing the positional relation between a wiring head and a wiring base in the cross section of the wiring base shown in FIG. 1.
Figure 5B:
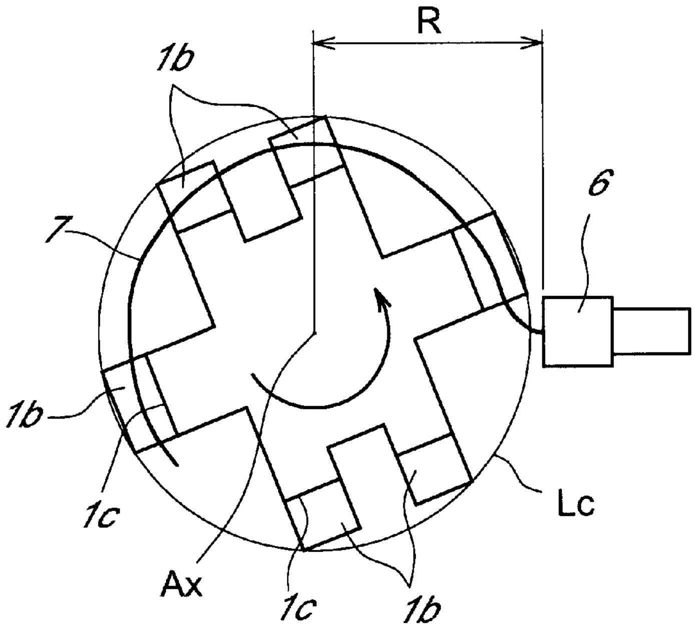

In this step, the plurality of electric wire grooves 1*c* on the wiring base 1 are positioned in the substantially concentric form. Because of this feature, when the wiring head 6 is positioned at the range R, which is almost equal to a radium of the locus Lc to the wiring base 1 with the periphery rotating following the locus Lc indicated by the dash-and-dot line as shown in FIG. 5A and FIG. 5B, interference between the wiring head 6 and wiring base 1 never occurs. Therefore, the electric wire 7 can be wired in a required form by using the electric wire grooves 1*c* and only by moving the wiring head 6 in one direction along the axis Ax of the wiring base 1 (in the direction from to a top surface to a rear surface of paper in FIG. 5A and FIG. 5B) changing the velocity, and it is not necessary to move the wiring head 6 to and away from the wiring base 1.

Therefore, when the wiring base 1 is used, it is not necessary to incorporate, for producing the wire-wound member 3, a device for moving the wiring head 6 to and away from the wiring base 1. Therefore when a wire-wound member is produced using the wiring base 1, cost of the wiring base 1 becomes lower, and in addition the wiring speed can be quickened. Because of this feature, also it is possible to provide the wire-wound member 3 and an electrical connection box using the wire-wound member 3 therein with low cost.

The wire-wound member 3 produced as described above is cut at a prespecified position according to a prespecified wiring pattern.

Figure 6:
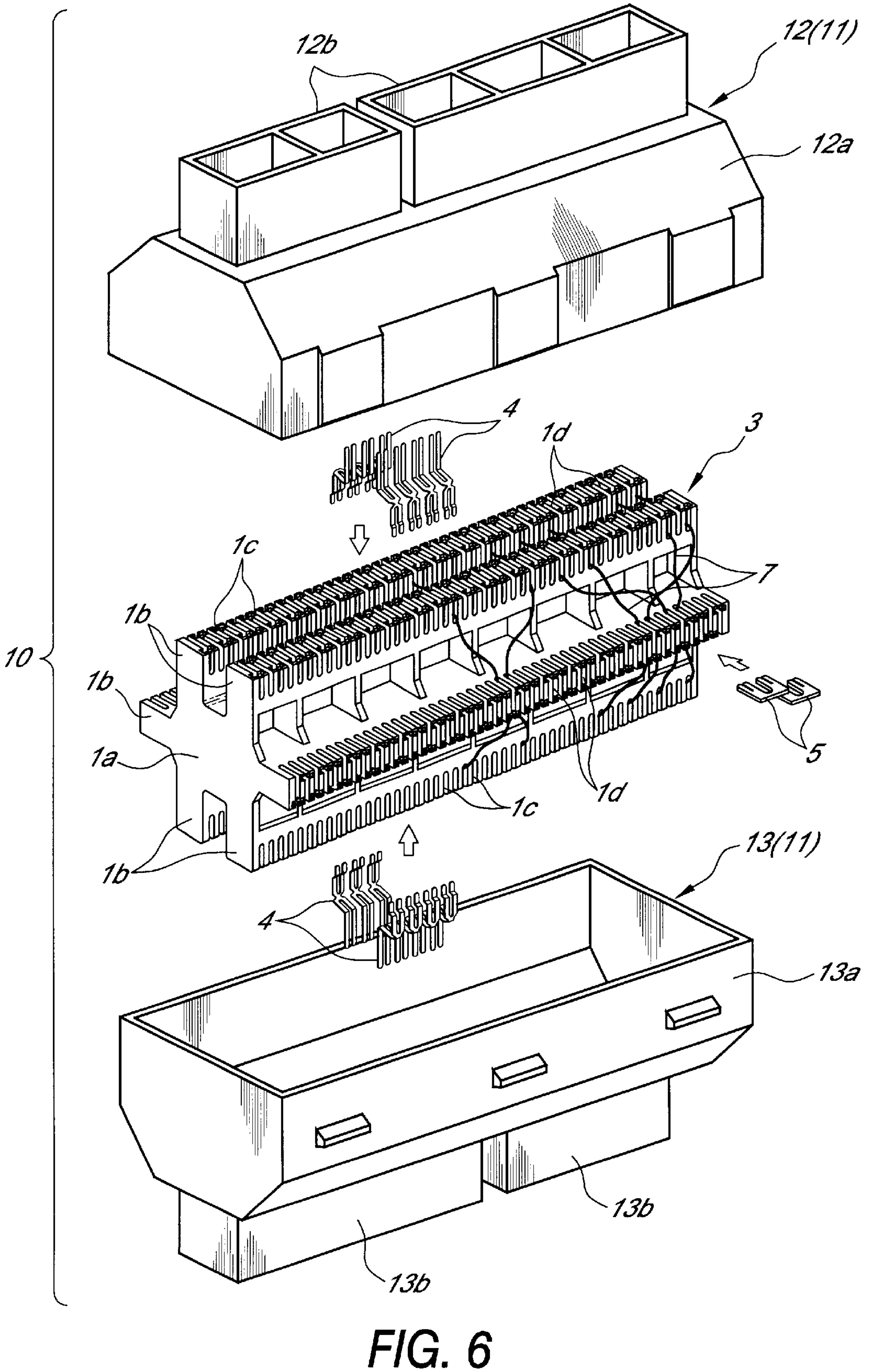
FIG. 6 is an exploded perspective view showing an electrical connection box manufactured by using the wire-wound member shown in FIG. 3.

Then a pressure connection terminal 4 or a joint terminal 5 is attached to the terminal groove 1*d* corresponding to a prespecified position of the electric wire 7 and the wire-wound member 3 is accommodated in a casing 11 having an upper casing 12 and a lower casing 13, thus the electrical connection box 10 shown in FIG. 6 being manufactured.

The upper casing 12 and lower casing 13 have a plurality of connector housings 12*b*, 13*b* each for accommodating an edge section of the pressure connection terminal 4 therein and used for connection with the pressure connection terminal 4 via a connector not shown in the figure above the main body 12*a* and under the main body 13*a* respectively.

The wiring base according to the present invention is not always limited to the wiring base 1 described above so long as the electric wire grooves are positioned in the substantially concentric form. For instance, like in the wiring base 15 as shown in FIG. 8, a plurality of wing sections 15*b* formed on the main body 15*a* may be positioned at a 90-degree angular space therebetween to form a T-shaped form against the axis Ax with the electric wire grooves 15*c* each for accommodating the electric wire 7 therein provided in the substantially concentric form when viewed from the central axis Ax.

Figure 9:
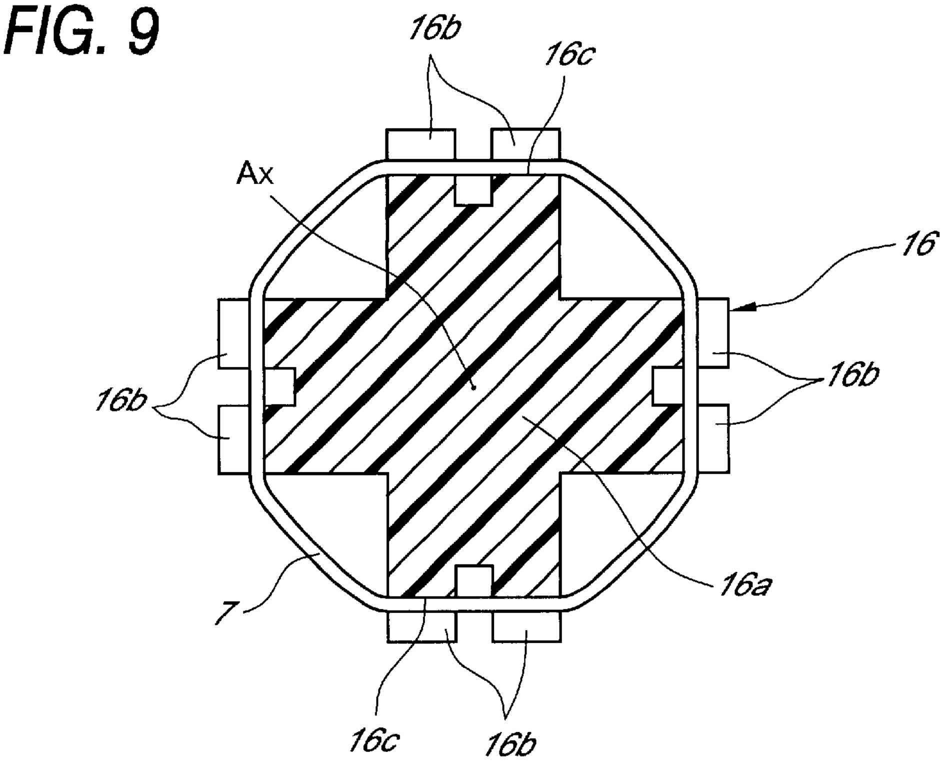
FIG. 9 is a cross-sectional view showing a second variant of the wiring base according to the present invention.

Further, the configuration is allowable in which, like in the wiring base 16 shown in FIG. 9, two wing sections 16*b* separated at the angular space of 90 degrees against the axis Ax are provided on a main body 16*a* with electric wire grooves 16*c* each for accommodating the electric wire 7 therein positioned in the substantially concentric form when viewed from the central axis Ax.

Figure 10:
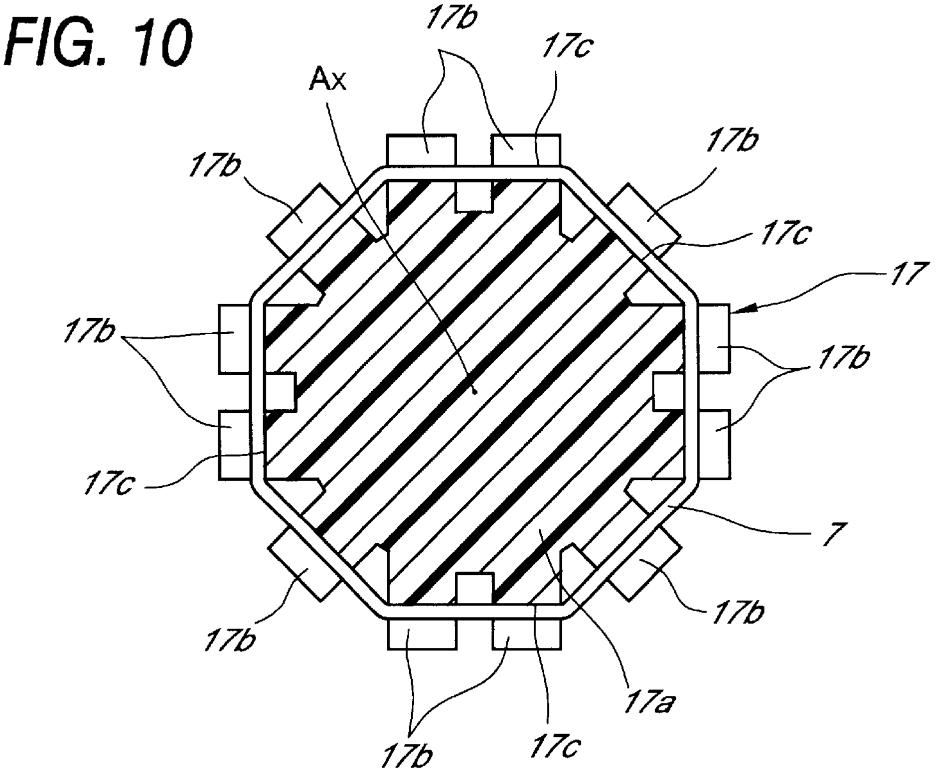
FIG. 10 is a cross-sectional view showing a third variant of the wiring base according to the present invention.

Still further, the configuration is allowable in which, like in the wiring base 17 shown in FIG. 10, combination each comprising two narrow wing sections 17*b* and one wide wing section 17*b* positioned alternately at the angular space of 45 degrees against the axis Ax are provided with electric wire grooves 17*c* each for accommodating the electric wire 7 therein positioned in the substantially concentric form when viewed from the central axis Ax.

Figure 11:
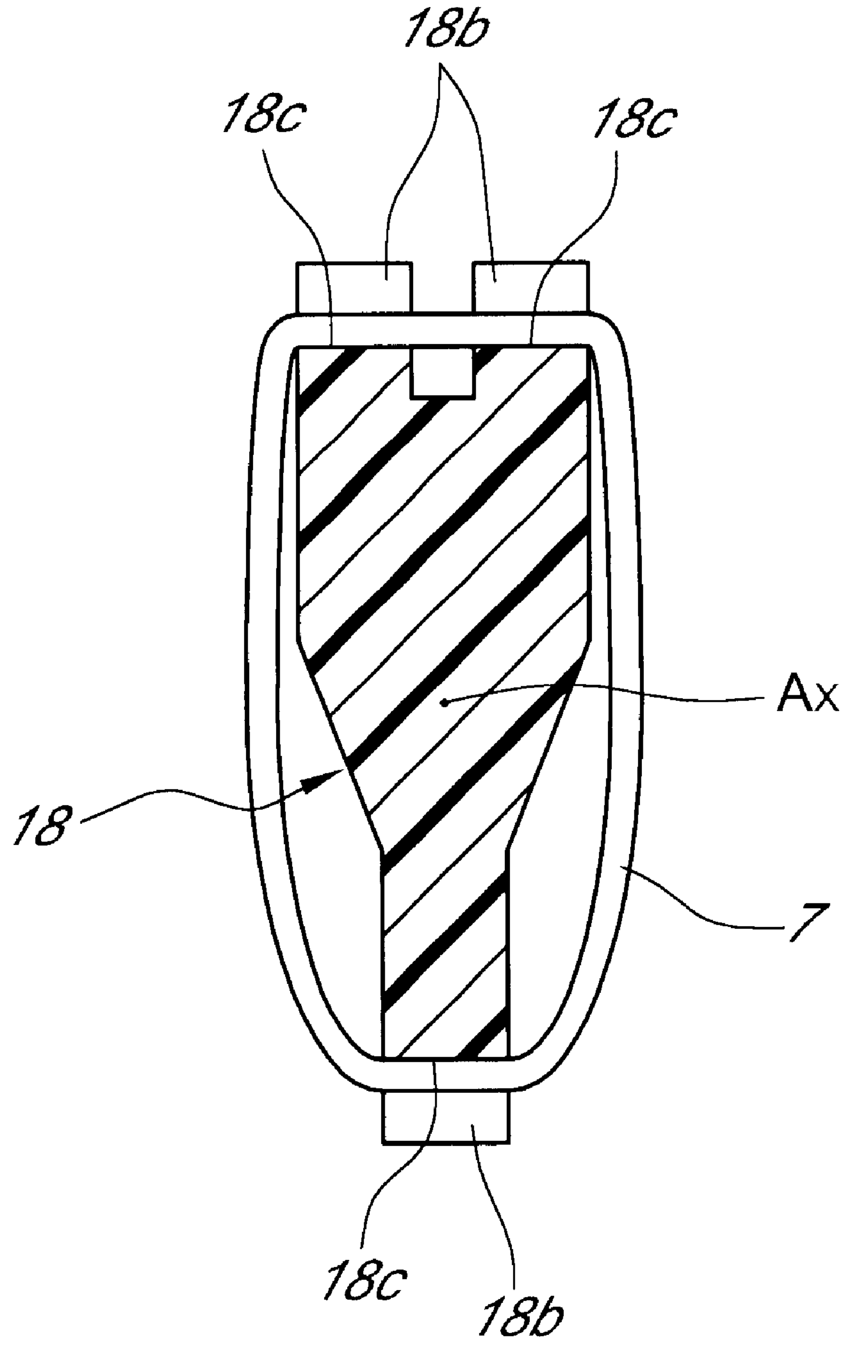
FIG. 11 is a cross-sectional view showing a fourth variant of the wiring base according to the present invention.

Also the configuration is allowable in which, like the wiring base 18 shown in FIG. 11, two wing sections 18*b* are provided in one side with one wing section 18*b* provided in the other side at the angular space of 180 degrees from the two wing sections 18*b* above and electric wire grooves 18*c* each for accommodating the electric wire 7 therein may be positioned in the substantially concentric form when viewed from the central axis Ax. In this case, the number of wiring bases 18 may be one or two, and in the latter case, the two sheets of wiring bases 18 may be overlaid on each other in the direction of thickness in the state as shown in the figure.

In the above-described embodiment, while the wiring base 1 is rotated about the axis Ax, the wiring head 6 was moved along the axis Ax to wire the electric wire 7 in the desired form.

Figure 12:
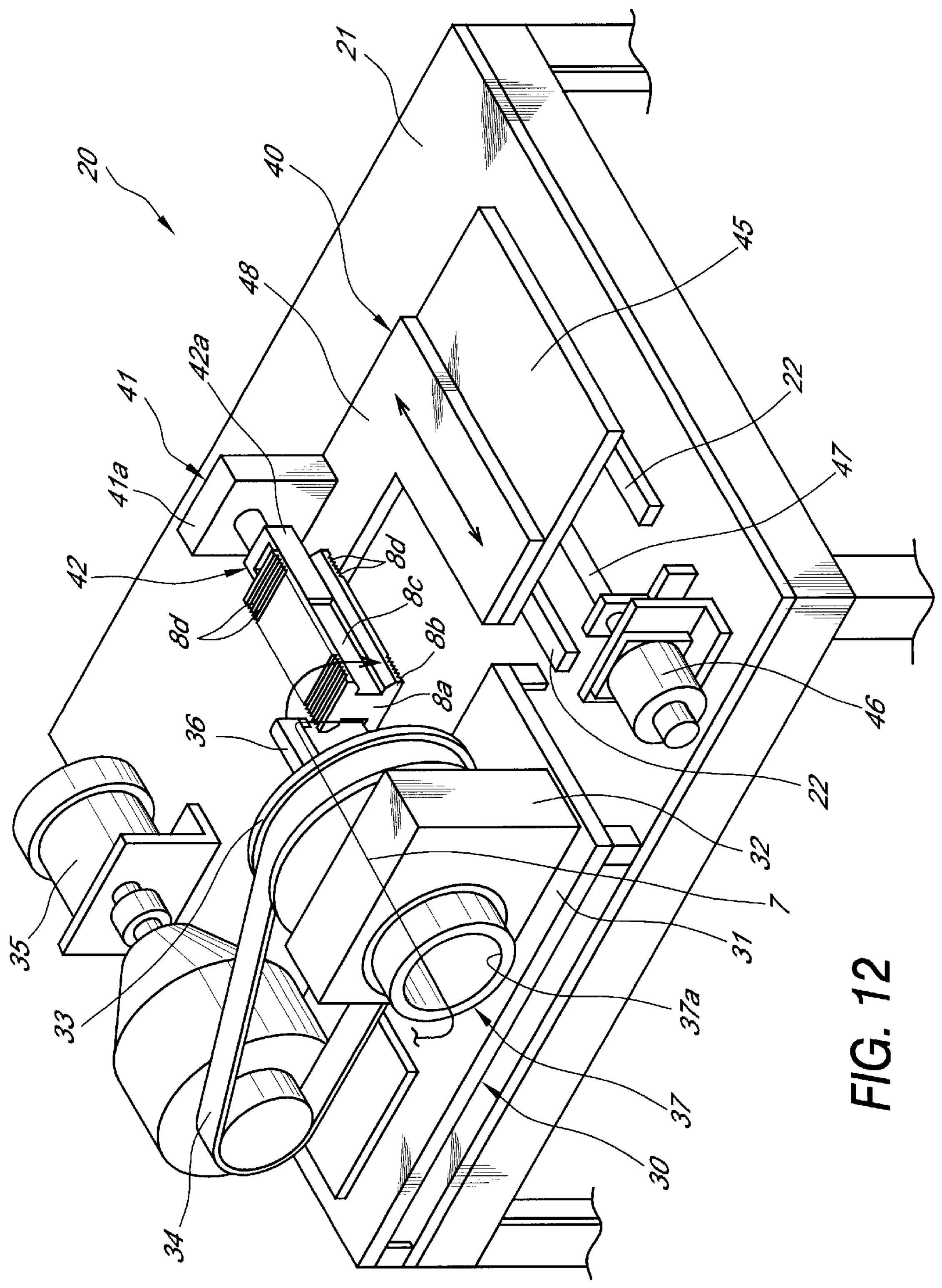
FIG. 12 is a perspective view showing an example of a wiring device for wiring an electric wire on the wiring base according to the present invention.
Figure 13A:
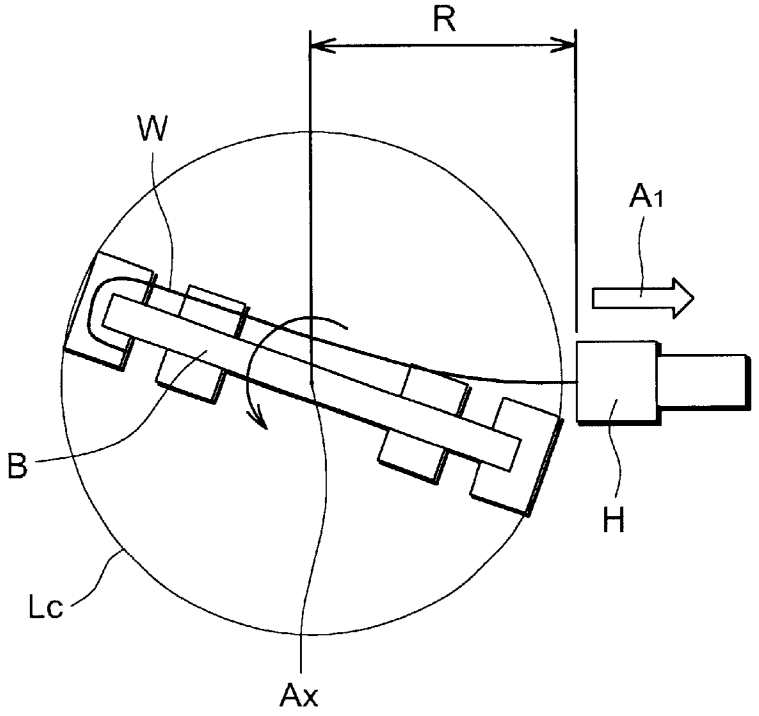
FIG. 13A (PRIOR ART)
FIG. 13A and FIG. 13B are explanatory views each showing the positional relation between a wiring head and a wiring base in a cross section of a conventional type of wiring base.
Figure 13B:
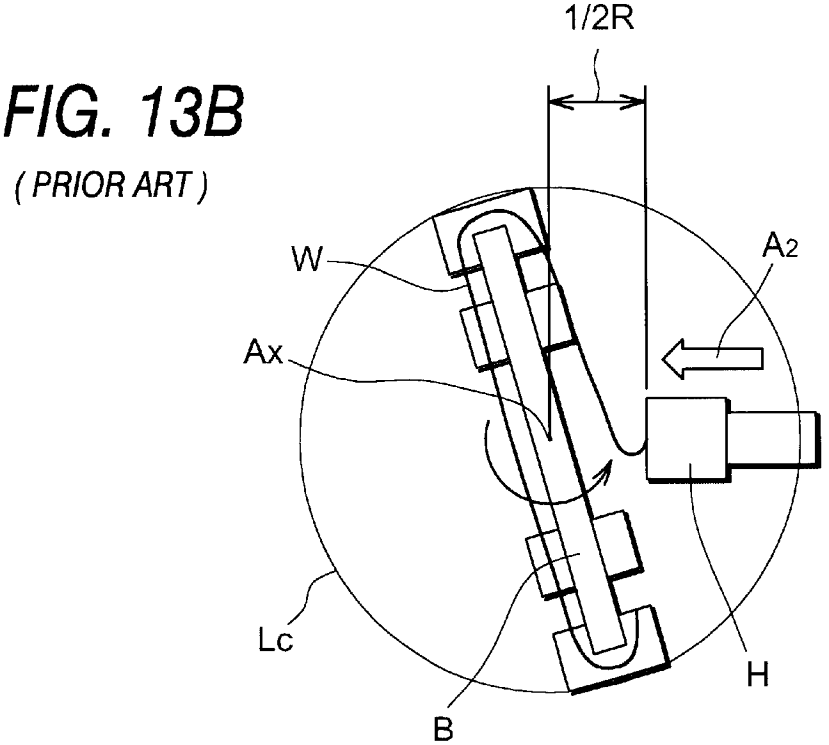
FIG. 13B (PRIOR ART)

When the wiring device 20 shown in FIG. 12 is used, however, it is possible to wire the electric wire 7 in a desired form by moving the wiring base 1 along the axis Ax while rotating the wiring head 6 about the axis Ax contrary to the embodiment described above.

The wiring device 20 has a electric wire winding section 30 and a fixing section 40 each provided on a table 21.

The electric wire winding section 30 has a support base 32 provided on a basement 31 placed on the table 21. The support base 32 has a pulley 33 rotatably supported on one surface thereof. The pulley 33 is rotated by a motor 35 via a belt 34 in the direction indicated by the arrow in the figure, and has a wiring head 36 protruding to the side of fixing section 40 provided on the side face. In addition, the support base 32 has an insertion cylinder 37 provided on the other surface thereof. The insertion cylinder 37 guides the electric wire 7 inserted from an opening 37*a* to the wiring head 36.

The fixing section 40 has a fixing tool 41 for fixing a wiring base 8 and a slide table 45.

The fixing tool 41 has a grip member 42 attached to a support block 41*a*. The grip member 42 has a holding section 42*a* for holding the wiring base 8 with its concave section 8*c*.

The wiring base 8 is made from the same synthetic resin as that used for the wiring base 1, and as shown in FIG. 12, has a plurality of wing sections 8*b* protruding from the main body 8*a* having at its center the axis Ax functioning as a rotation axis in the wiring work. The main body 8*a* have two concave sections 8*c* opposite to each other. The plurality of wing sections 8*b* have the equal length in the radial direction when measured from the axis Ax. In addition, the plurality of wing sections 8*b* are formed so that electric wire grooves 8*d* each for accommodating an electric wire therein are positioned in the substantially concentric form. Further each of the plurality of wing sections 8*b* has a terminal groove at its tip.

The slide table 45 slides in association with rotation of a ball screw 47 rotated by a motor 46 along two guide rails 22 provided on the table 21 in the direction indicated by the arrow A3 in the figure. The slide table 45 supports the fixing tool 41 via a board 48.

The wiring device 20 has the configuration as described above, and slides the slide table 45 at various velocities in the direction indicated by the arrow A3 by rotating the pulley 33 with the motor 35 and also electronically controlling the motor 46. Because of the configuration, the wiring device 20 can wire the electric wire 7 fed out from the wiring head 36 in a desired form by making use of the electric wire grooves 8*d* of the wiring base 8 fixed by the fixing tool 41.

What is claimed is:

1. A wiring base made from an electrically insulating material rotated about its axis functioning as a rotational axis in a wiring work for wiring an electric wire thereon, wherein said wiring base has a plurality of wing sections each radially protruding against the axis and electric wire grooves are provided on the plurality of wing sections in the substantially concentric form, wherein at least one of the wing sections comprises a terminal groove for receiving at least one terminal.

2. A wiring base made from an electrically insulating material rotated about its axis functioning as a rotational axis in a wiring work for wiring an electric wire thereon, wherein said wiring base has a plurality of wing sections each radially protruding against the axis and electric wire grooves are provided on the plurality of wing sections in the substantially concentric form, wherein each of the wire grooves are configured to receive a single strand of the electric wire.

3. A wire-wound member production method, wherein a wire-wound member is produced by rotating a wiring base made from an electrical insulating material, extending in parallel in the axial directions, and having wing sections protruding radially against the axis with electric wire grooves each for accommodating therein an electric wire provided in the substantially concentric form or the electric wire about the axis of said wiring base and at the same time relatively moving said electric wire or said wiring base in the axial direction of said wiring base to wind the electric wire in said electric wire grooves, wherein at least one of the wing sections comprises a terminal groove for receiving at least one terminal.

4. A wire-wound member produced by the production method of claim 3.

5. An electrical connection box accommodating the wire-wound member produced by the production method of claim 3 in its casing.

6. An electrical connection box accommodating the wire-wound member produced by the production method of claim 3 in its casing.

7. A wire-wound member production method, wherein a wire-wound member is produced by rotating a wiring base made from an electrical insulating material, extending in parallel in the axial directions, and having wing sections protruding radially against the axis with electric wire grooves each for accommodating therein an electric wire provided in the substantially concentric form or the electric wire about the axis of said wiring base and at the same time relatively moving said electric wire or said wiring base in the axial direction of said wiring base to wind the electric wire in said electric wire grooves, wherein each of the wire grooves receives a single strand of the electric wire.

8. A wire-wound member produced by the production method of claim 7.

* * * * *